US009090774B2

(12) United States Patent
Chlopek et al.

(10) Patent No.: US 9,090,774 B2
(45) Date of Patent: *Jul. 28, 2015

(54) OIL- AND WAX-CONTAINING COMPOSITIONS IN PIECE FORM FOR THE COLORING OF ASPHALT AND BITUMEN

(75) Inventors: Krzysztof Chlopek, Krefeld (DE); Jurgen Kischkewitz, Ratingen (DE); Lutz Kohnert, Duisburg (DE); Holger Inden, Wuppertal (DE)

(73) Assignee: LANXESS DEUTSCHLAND GMBH, Cologne (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/997,465

(22) PCT Filed: Dec. 30, 2011

(86) PCT No.: PCT/EP2011/074309
§ 371 (c)(1),
(2), (4) Date: Dec. 11, 2013

(87) PCT Pub. No.: WO2012/089835
PCT Pub. Date: Jul. 5, 2012

(65) Prior Publication Data
US 2014/0083330 A1  Mar. 27, 2014

(30) Foreign Application Priority Data

Dec. 30, 2010  (EP) .................................... 10197401

(51) Int. Cl.
| *C09C 3/08* | (2006.01) |
| *C09C 1/22* | (2006.01) |
| *C08L 95/00* | (2006.01) |
| *C04B 20/10* | (2006.01) |
| *C04B 26/26* | (2006.01) |
| *C04B 40/00* | (2006.01) |
| *C09C 1/24* | (2006.01) |
| *C09C 1/34* | (2006.01) |
| *C09C 1/36* | (2006.01) |

(52) U.S. Cl.
CPC ............. *C08L 95/00* (2013.01); *C04B 20/1025* (2013.01); *C04B 26/26* (2013.01); *C04B 40/0039* (2013.01); *C09C 1/22* (2013.01); *C09C 1/24* (2013.01); *C09C 1/346* (2013.01); *C09C 1/3607* (2013.01)

(58) Field of Classification Search
CPC ............. C09C 1/22; C09C 1/24; C09C 1/346; C09C 1/3607; C09C 1/3669; C09C 3/08; C04B 20/1025
USPC ......................................... 106/447, 453, 460
See application file for complete search history.

(56) References Cited

U.S. PATENT DOCUMENTS

| 3,778,288 | A | | 12/1973 | Ridge et al. | |
| 5,389,137 | A | * | 2/1995 | Linde et al. | ................. 106/281.1 |
| 6,485,558 | B1 | * | 11/2002 | Metz et al. | ..................... 106/493 |
| 6,706,110 | B2 | | 3/2004 | Egger et al. | |
| 6,780,234 | B2 | | 8/2004 | Egger et al. | |
| 7,112,618 | B2 | | 9/2006 | Otto et al. | |
| 7,399,354 | B2 | * | 7/2008 | Metz et al. | ..................... 106/493 |
| 7,863,353 | B2 | | 1/2011 | Hakata et al. | |

OTHER PUBLICATIONS

"Attenuation Grade TiO2 Dispersions", Technical Literature ref TiD-003, Oct. 2, 2013, Kobo Products, Inc. So. Plainfield, NJ 07080 USA, available from www.koboproducts.com.
International Search Report from International Application PCT/EP2011/074309 dated Mar. 6, 2012, 3 pages.

* cited by examiner

Primary Examiner — Anthony J Green

(57) ABSTRACT

The present invention concerns agents containing at least one inorganic pigment, one or more oils, and one or more waxes, and also processes for production thereof and their use for coloration of building products, preferably asphalt, bitumen, bituminous mixtures, tar and tar-containing compositions, and also a process for coloration of building products and the building products colored with the agents.

17 Claims, No Drawings

OIL- AND WAX-CONTAINING COMPOSITIONS IN PIECE FORM FOR THE COLORING OF ASPHALT AND BITUMEN

The present invention concerns agents containing at least one inorganic pigment, one or more oils, and one or more waxes, and also processes for production thereof and their use for coloration of building products, preferably asphalt, bitumen, bituminous mixtures, tar and tar-containing compositions, and also a process for coloration of building products and the building products colored with the agents.

FIELD OF USE

The processing of pigments to achieve optimal color impression requires that the pigments be ground to form primary particles. The resultant powders are very prone to dusting and tend to stick to each other and to packaging, machine parts and metering equipment because of their fine state of subdivision. Substances recognized as hazardous by toxicologists therefore require that measures be taken in the course of processing to avoid any harm to humans and the environment due to resultant dusts. But even in the case of unconcerning inert substances, such as iron oxide pigments for example the market is increasingly demanding dust nuisance control.

Dust avoidance and improved metering due to good flow properties to achieve a qualitatively uniform color impression on use in building products and organic media is therefore the goal of pigment handling. This goal is more or less achieved by applying granulation processes to pigments.

Granular pigments, by whichever method they are produced, are in principle required by the market to have two contradictory properties: mechanical stability (abrasion stability) on the part of the granule and good dispersing properties in the medium used. Mechanical stability is responsible for good transport properties not only in relation to the transport between the producer and the user but also for good metering and properties of flow when the pigments come to be used. Mechanical stability is due to high bonding forces and depends for example on binder quantity and type. On the other hand, dispersibility is influenced by good grinding prior to granulation (wet and dry grinding), by the mechanical energy at incorporation into the particular application medium (shearing forces) and by dispersion assistant which immediately reduce the bonding forces in the pellet in the course of incorporation in a medium. If optimal color impression is to be achieved, the pigment granules have to subdivide into primary particles. In the case of inorganic pigments, the use of comparatively large amounts of dispersion assistant is constrained by the cost ratio of auxiliary/pigment.

For coloration of building products, such as asphalt for example, the pigments are still being used in a pulverulent state in some instances. They have the advantage of good dispersibility when ground. Complete and homogeneous dispersal of such pulverulent inorganic pigments in the asphalt mixer is effected within a short time—generally within one minute. The disadvantage of these fine powders is that they do not have good flowability and they are frequently prone to cake and clump together if improperly stored. They stick to packaging and machine parts, which compromises accurate metering during processing. A further disadvantage with powders is that they are prone to dusting.

PRIOR ART

Dust avoidance and improved metering in the use of pigments for coloration of organic media, especially asphalt, is a primary objective because asphalt-mixing facilities are very often localized in residential districts.

According to U.S. Pat. No. 3,778,288, granules can be produced as "masterbatches" by addition of waxes in a progressive-agglomeration process via a heatable mixer. Different particle sizes are obtained depending on reaction conditions. These granules are used in the coloration of polymers such as plastics, waxes or resins. The best particle sizes for granules used in such applications are between 0.2 and 2 mm (70 to 10 mesh). The waxes, which are used as hinders, are preferably used in concentrations of 26% to 65 wt % based on the amount of pigment used. This high binder fraction is disadvantageous for use in the coloration of building products, since the binder can have an adverse effect on the properties of building products. Moreover, distinctly higher amounts of "masterbatch" are needed compared with the inorganic pigment to achieve the same coloring effect, making the use uneconomical.

EP 0 567 882 A1 describes a process for coloration of asphalt and/or bitumen with inorganic pigment granules wherein the granules can be formed by addition of oils and/or waxes. The stated amount of additives (0.01- to 10 wt % based on pigment) does improve the dispersibility of granules in bitumen, but this process is not capable of providing granules having sufficient mechanical stability.

EP 1 598 395 A1 describes a composition based on copolymers of ethyl vinyl acetate for asphalt. Extrusion granules are concerned here. A person skilled in the art is aware that plastics extrusion with iron oxide leads to considerable wear of asphalt-processing equipment due to the abrasive properties of the pigment.

U.S. Pat. No. 6,706,110 B2 and U.S. Pat. No. 6,780,234 B2 disclose pigment granules for the coloration of apolar media such as asphalt and bitumen by addition of waxes and dispersing agents for polar media. The method is a spray-granulation process of aqueous systems. Spray granulation predicates dropletization and so requires the use of readily flowable, i.e., liquid, suspensions. Since a comparatively large amount of water has to be evaporated for drying, however, the process is energy intensive and therefore advantageous to use in particular when the pigments to be granulated are in the wet phase, for example in an aqueous suspension or paste, by virtue of their method of making. In the case of pigments obtained via a dry method of making, for example calcination, spray granulation is an additional operation, since the as-obtained dry pigment has to be resuspended in water and dried. In addition, granules obtained via spray granulation have a particle size between 20 to 500 μm, which causes significant dusting in the metered addition. Particles less than 1 mm in size still count as dust from the viewpoint of protecting the employees involved in asphalt processing.

Pigment compositions provided in the prior art are unsuitable for safe and economical use in the coloration of building products that are processed at temperatures higher than ambient, such as asphalt, bitumen, bituminous mixtures, tar and tar-containing compositions.

The problem addressed by the present invention was accordingly that of providing low-dust, readily meterable agents which contain inorganic pigments, are obtainable in an economical manner, and are useful for coloration of building products that are processed at temperatures higher than ambient.

The stated is surprisingly solved by providing agents containing at least one inorganic pigment, one or more oils and one or more waxes.

The invention accordingly provides an agent containing at least one inorganic pigment, one or more oils, and one or more waxes, where at least 50 wt %, preferably at least 70 wt %, more preferably at least 80 wt %, of the agent have a particle size of 1 mm or more, preferably of 1 to 10 mm and more preferably 1 to 6 mm, characterized in that the agent has an attrition value of 10 wt % or less, preferably of 5 wt % or less and more preferably of 2 wt % or less. Attrition value for the purposes of the invention is to be understood as meaning the percentage weight fraction of subsize measured in the attrition test described under "Examples and Methods" after whirling up the agent for a period of 5 minutes.

The agent of the present invention fully meets the requirements concerning dispersibility in application media and concerning the hue obtained in the colored application media compared with the ungranulated inorganic pigment.

The agent of the present invention is in piece form. "Agent" hereinbelow is to be understood as meaning agglomerates of primary particles, these agglomerates differing in their maximum spatial extent from that of primary particles. "Agent" also comprehends granules. "Granule" or "in granular form" in the context of the invention is to be understood as meaning any material whose average particle size has been increased, compared with the starting materials, by a treatment step. "Granule" or "in granular form" therefore comprehends not just sprayed granules, compacted granules (pressed or briquetted granules) or progressive-agglomeration granules, but also, for example, products of a wet or moist treatment with subsequent comminution, and products of dry or essentially dry processing steps, for example dry-produced granules, briquettes and the like. The agents of the present invention are preferably progressive-agglomeration granules, more preferably progressive-agglomeration granules produced via a heatable mixer.

The agents of the present invention are preferably in the form of spherical agglomerates, and these can have the shape of a sphere or the shape of an ellipsoid and also intermediate forms thereof.

It may be pointed out that the ambit of the invention also encompasses any desired combinations of recited ranges and preferences for every feature including combinations of preference ranges.

In the agents of the present invention, the inorganic pigments are preferably selected from the group of iron oxides, iron oxide hydroxides, chromium oxides, titanium dioxides and/or mixed-phase pigments based on metal oxides. Iron oxides include for example hematite (iron oxide red) or magnetite (iron oxide black). Iron oxide hydroxides include for example goethite (iron oxide yellow). Mixed-phase pigments based on metal oxides are, for example, zinc ferrites (mixed-phase pigment from zinc oxide and iron oxide) or manganese ferrites (mixed-phase pigment from manganese oxide and iron oxide). The agent of the present invention may contain one or more inorganic pigments. Preferably, the agent of the present invention contains one inorganic pigment.

The agents of the present invention contain one or more oils. Oils in the context of the present invention are non-polar or slightly polar substances which are liquid at room temperature and not volatile. Preference is given to oils having a kinematic viscosity of 1.6 to 1500 mm$^2$/s at 40° C. (measured to DIN 51562). In the agents of the present invention, preference is furthermore given to selecting oils from the group of synthetic oils, consisting essentially of the elements carbon and hydrogen and/or nitrogen and/or oxygen, and/or sulfur and/or halogens (preferably fluorine, chlorine, bromine and/or iodine) and/or boron, mineral oils, animals oils and/or vegetable oils. It is particularly preferable for the agents of the present invention to contain synthetic oils based on hydrocarbons, or mineral oils (obtained from petroleums or coals).

In the agents of the present invention, the total amount of oil or oils is preferably from 0.1% to 5.0 wt %, more preferably from 0.4 to 3.0 wt %, and even more preferably from 0.5 to 2.45 wt %, based on the total amount of the agent. The agent of the present invention may contain one or more oils. Preferably, the agent of the present invention contains one oil.

In the agents of the present invention, the total amount of wax or waxes is preferably from greater than 10 to 25 wt % and more preferably from 13 to 20 wt %, based on the total amount of the agent. The agent of the present invention may contain one or more waxes. Preferably, the agent of the present invention contains one wax.

Wax refers to a substance which is coarse to finely crystalline, melts above 40° C. without decomposition and is non-ropey and of comparatively low viscosity even just above the melting point. Preferably, the agent of the present invention contains one or more comparatively high-melting natural and/or chemically modified and/or synthetic waxes. It is more preferable for the waxes to be selected from the group of Fischer-Tropsch waxes, mineral waxes, montan waxes, vegetable waxes and/or animal waxes. Fischer-Tropsch waxes are synthetic aliphatic hydrocarbons, i.e., synthetic paraffin waxes having a high molecular mass and a chain length of 20 to 120 carbon atoms. The group of Fischer-Tropsch waxes also includes oxidized Fischer-Tropsch waxes. Fischer-Tropsch waxes generally have a congealing point of greater than 70° C. They are relatively hard, which can be measured via the needle penetration at 25° C. in the unit "mm". Methods for measuring the needle penetration at different temperatures, for example 25° C. or 65° C., include the methods of ASTM D 1321 or DIN 51579 for example. Typical values of needle penetration at 25° C. for these waxes are in the range from 0.1 mm to 1 mm. Fischer-Tropsch waxes are produced via the so-called Fischer-Tropsch process from Syngas (hydrogen, carbon monoxide) from coal gasification or from natural gas in the presence of catalysts. Mineral waxes are mixtures of normal, branched-chain or ring-shaped saturated hydrocarbons, which are obtained by refining waxes of fossil origin, for example ceresin. The group of mineral waxes also includes the microcrystalline hard waxes. Montan waxes are natural waxes which are extractable from lignite varieties. These natural waxes have formed from resins, waxes and fats of Tertiary plants. Sugar cane wax and carnauba wax are examples of vegetable waxes. Animal waxes include spermaceti, lanolin and beeswax.

The waxes may be present therein in their original, i.e., chemically unmodified, form, or in their chemically modified forms.

The agents of the present invention preferably contain Fischer-Tropsch waxes and/or mineral waxes. Microcrystalline hard waxes are particularly preferred among the group of mineral waxes.

More particularly, the waxes have a congealing point between 50 and 140° C., preferably between 70 and 120° C. and more preferably between 80 and 110° C. The agents of the present invention preferably contain waxes having a dynamic viscosity at 120° C. below 800 mPas, more preferably below 300 mPas and most preferably in the range from 1 to 100 mPas.

The congealing point, which is technically more important for the processing of waxes than the melting point is, is a physical property of waxes which is often measured instead of the melting point. The congealing point can be measured to ISO 2207 or even to ASTM D 938.

The agents of the present invention may additionally contain further, auxiliary materials which, however, must not impair the properties of the agent such as dust characteristics, doseability and dispersibility, or the agent of the present invention simply does not contain these further, auxiliary materials.

The agent of the present invention more preferably contains the combination of iron oxide or chromium oxide, a mineral oil, and a microcrystalline hard wax.

The invention also provides processes for producing the agents of the present invention, characterized in that
   a) at least one inorganic pigment is mixed with one or more oils and
   b) the mix of step a) is mixed with one or more waxes,
   c) the mixture of step b) is further mixed at a temperature above the congealing point of the wax or waxes, (variant A)
or
   a') at least one inorganic pigment is mixed with one or more waxes and
   b') the mix of step a') is mixed with one or more oils,
   c') the mixture of step b') is further mixed at a temperature above the congealing point of the wax or of the waxes, (variant B)
or
   at least one inorganic pigment is simultaneously mixed with one or more oils and with one or more waxes, and the mixture is then further mixed at a temperature above the congealing point of the wax or of the waxes (variant C).

The process of forming the agent may in this context also be referred to as constructing the granule by progressive agglomeration. Preferred embodiments of variants A, B and C of the process according to the present invention utilize as oils and waxes the specific products which were disclosed under these generic terms in the course of the description of the agent of the present invention.

The production processes of variants A, B and C preferably comprise the steps whereby the agent formed is cooled down to ambient temperature and then sieved to a particle size range such that at least 50 wt %, preferably at least 70 wt % and more preferably at least 80 wt %, of the agent has a particle size of 1 mm or more, preferably from 1 to 10 mm and more preferably from 1 to 6 mm; or does not comprise these steps. Cooling the agent down to ambient temperature may or may not be done in a vibratory conveyor or fluidized-bed cooler or in some other way with liquid or gaseous media. The production processes for variants A, B and C may also be practiced with or without the over- and/or undersize obtained after sieving, i.e., the agent above and/or below the desired particle size, be recycled into the production process for the agent. During the production process, the recycled over- and/or undersize then combines with the other components introduced into the process to form the agents of the present invention.

Steps a) or a') in the embodiments of the process according to the present invention where the oil or oils, and the wax or the waxes are added to the inorganic pigment in succession (variants A and B) are preferably carried out below the congealing point of the wax or of the waxes. Adding the oil or oils in variant A or the wax or the waxes in variant B to the inorganic pigment can be carried out before or during the mixing operation. In variant A, the oil becomes uniformly dispersed over the inorganic pigment during the mixing operation. The powder remains flowable in the operation. The mixture is then preferably heated to a temperature in the range from 60 to 150° C. and more preferably to a temperature in the range from 90 to 140° C. before steps b) or b'). This is followed, in variant A, by adding the wax or waxes in the form of powders, flakes, pieces or in the molten state to the oil-treated inorganic pigment or, in variant B, by adding the oil or oils to the inorganic pigment mixed with the wax. Thereafter, the mixture is increased to a temperature above the congealing points of the wax or of the waxes. Steps c) or c') are preferably carried out at 110° C. to 230° C. The temperature increase is either due to the shearing forces during the mixing operation and/or due to external supply of heat. The wax melts and becomes dispersed over the oil-treated inorganic pigment to form the agent.

Blending the inorganic pigment with the oil(s), the Fischer-Tropsch wax and the second wax in the embodiment of the process according to the present invention where the oil or oils, the wax or the waxes are added simultaneously to the inorganic pigment (variant C) is carried out at temperatures below or above the congealing points of the waxes. Preferably, mixing the inorganic pigment with the oil(s), the wax(es) is done at temperatures below the congealing points of the waxes. Subsequently, the temperature of the mixture is raised to a temperature above the congealing points of the wax, preferably to a temperature in the range from 110° C. to 230° C., and the mixing operation is continued. The temperature increase is either due to the shearing forces during the mixing operation and/or due to external supply of heat. The wax melts and becomes dispersed over the inorganic pigment together with the oil to form the agent.

Various heatable mixing assemblies providing sufficient mixing effect and shearing forces can be used. Preferably, a heatable Henschel mixer is used.

The particle size of the agents according to the present invention increases monotonously during the mixing operation of the production processes for variants A, B and C. The mixing operation is therefore discontinued at a suitable point in time. When the mixing operation is carried out for too short a time, agents are obtained with too small a particle size. When the mixing time is too long, the agents become too coarse, which may have an adverse effect on dispersibility in asphalt. This leads to nonuniform coloration of the asphalt. The mixing operation is therefore discontinued once the maximum percentage fraction of the agent having a particle size of 1 mm or more, preferably of 1 to 10 mm, more preferably of 1 to 6 mm, based on the total amount of the agent, is reached.

After the mixing operation in variants A, B and C of the production process according to the present invention has been discontinued, the agent of the present invention is cooled down to ambient temperature and subsequently sieved to a particle size range such that at least 50 wt % of the agent has a particle size of 1 mm or more, preferably at least 70 wt % of the agent has a particle size of 1 mm or more and more preferably at least 80 wt % of the agent has a particle size of 1 mm or more,
or
at least 50 wt % of the agent has a particle size in the range from 1 to 10 mm, preferably at least 70 wt % of the agent has a particle size in the range from 1 to 10 mm and more preferably at least 80 wt % of the agent has a particle size in the range from 1 to 10 mm,
or
at least 50 wt % of the agent has a particle size in the range from 1 to 6 mm, more preferably at least 70 wt % of the agent has a particle size in the range from 1 to 6 mm and more preferably at least 80 wt % of the agent has a particle size in the range from 1 to 6 mm.

The agent of the present invention is notable for good flowability, for a low dust content, for good attrition stability and also for high dispersibility in bitumen- or tar-containing building products and also for a similarly intense and comparable hue in the application medium compared with the ungranulated inorganic pigment.

The invention also provides for the use of the agent according to the present invention for coloration of building products, preferably asphalt, bitumen, bituminous mixtures, tar and tar-containing compositions. In this use, the agent of the present invention is added to the building product by mixing at a temperature below its congealing point. The mixing operation is continued until uniform coloration of the building product is obtained.

The invention also provides a process for coloration of building products, preferably asphalt, bitumen, bituminous mixtures, tar and tar-containing compositions, comprising mixing the agent of the present invention with the building product above the softening point thereof. In this process, the building product is mixed with the agent until uniform coloration of the building product is obtained.

The invention likewise provides building products, preferably asphalt, bitumen, bituminous mixtures, tar and tar-containing compositions, colored with the agent of the present invention.

The subject matter of the present invention will be apparent not just from the subject matter of the individual claims, but also from the combination of individual claims with each or one another. The same holds for all parameters disclosed in the description and any combinations thereof.

EXAMPLES AND METHODS

I. Description of Measuring and Testing Methods Used

The results of measurements regarding Examples 1 to 5 are summarized in table 1.

I.1 Dispersibility in Asphalt

Dispersibility in asphalt was determined as follows: The aggregates (mineral fillers for producing the asphalt) were homogenized in a heatable laboratory mixer (from Rego) together with Pigmental® 50/70 roadbuilding bitumen (commercial product from TOTAL Bitumen Deutschland GmbH) at 180° C. for 30 seconds. Thereafter, the pigment sample to be measured, i.e., the agents as per the examples, was added, which was followed by mixing at 180° C. for a further 120 seconds. The amount of pigment sample added was in each case 3 wt %, based on the entire composition. The mixture was used to produce Marshall specimens ("The Shell Bitumen Handbook", Shell Bitumen U.K., 1990, pages 230-232). Hue differences of Marshall specimens were evaluated colorimetrically by comparing the red values a* in the full shade versus a Marshall specimen produced using an identical amount of Bayferrox® 130 powder reference (iron oxide red pigment from LANXESS Deutschland GmbH) (measured using: Minolta Chromameter II, standard illuminant C, CIELAB system, DIN 5033, DIN 6174). Differences in the a* values (Δa* values) below 1.0 CIELAB units are visually indistinguishable. When the amount of the a* value of the test specimen colored with the sample to be measured is smaller than that of the test specimen colored with the Bayferrox® 130 powder reference, this points to a lower dispersibility on the part of the in-measurement sample versus the powder reference. The smaller the amount of the Δa* values in this measurement, the more alike the hue is for the different measurements, which points to a low difference in dispersibility of the in-measurement sample compared with the Bayferrox® 130 powder reference.

I.2 Determining the Particle Size Fraction of Agents

The particle size fraction was determined using a Retsch Vibtronic VE 1 sieve vibrator with sieve sets with 1 and 6 mm (sieve sets to DIN ISO 3310). The agent (50.0 g) was weighed onto the uppermost, largest sieve. The sieve set tower was vibrated at 1 mm vibration intensity for 2 min. Thereafter, each individual sieve was weighed and the sieve fraction determined.

I.3 Determining the Attrition Value of Agents

The attrition value was determined using a Rhewum LPS 200 MC air jet siever. The following settings were chosen: nozzle 1 mm, volume flow rate 35 m³/h, 1 mm sieve, rotary speed 18 rpm. The sieve to DIN ISO 3310 was weighed empty and then with 20 g of sample. Thereafter, the siever was switched on and the sample was put under 1, 2, 3, 4 and 5 minutes of stress (by the sieved material being whirled up by the air jet). After every minute, the sieve with the sample was weighed and later placed on the siever and sieved some more.

Calibration: (20 g (original weight)−final weight)/20 g of original weight×100=wt % of subsize (attrition value)

Good attrition stability (=low attrition value) as per this test is defined to be an amount of 10 wt % or less, preferably 5 wt % or less and more preferably of 2 wt % or less of subsize as measured after whirling up the sieved material for a period of 5 minutes (=attrition value after 5 min, see table 1).

II: Examples

Properties of Employed Inorganic Pigments, Oils and Waxes

Bayferrox® 130 pigment powder from Lanxess Deutschland GmbH: hematite (red iron oxide) having a BET surface area (to DIN ISO 9277) of 7-9 m²/g Energol RC-R 100 from BP: mineral oil having a kinematic viscosity of about 100 cSt at 40° C. (DIN 51562)

Tecero® 30332: microcrystalline wax from Wachs-u. Ceresin-Fabriken Th. C. Tromm GmbH; properties: congealing point (ISO 2207): 90-95° C., penetration at 25° C. (DIN 51 579) 0.4-0.7 mm, viscosity at 120° C. (DIN 53 019) 7-11 mPas Example 1

To 15.0 kg of Bayferrox® 130 iron oxide red pigment was added 0.150 kg of Energol RC-R 100 compressor oil at room temperature and the mixture was heated to about 100° C., and mixed for about 5 min, in a 75 L FM75 Henschel mixer, which was followed by the addition of 2.65 kg of Tecerowachs® 30332 wax and the entire mixture was further mixed for about 25 min (tool speed about 780 rpm) and heated up to about 180° C. in the process. The temperature was measured in-product.

The agent was then discharged via a valve, cooled down, sieved and weighed. The yield of agent was computed for the entire particle-size range between 1 to 6 mm (table 1).

Example 2

To 15.0 kg of Bayferrox® 130 iron oxide red pigment was added 0.150 kg of Energol RC-R 100 compressor oil and 2.70 kg of Tecerowachs® 30332 wax at room temperature. The mixture was mixed in a 75 L FM75 Henschel mixer for about 15 min (tool speed about 780 rpm) and heated up to about 180° C. in the process. The temperature was measured in-product.

The agent was then discharged via a valve, cooled down, sieved and weighed. The yield of agent was computed for the entire particle-size range between 1 to 6 mm (table 1).

TABLE 1

| | Inventive examples | | | | |
|---|---|---|---|---|---|
| | Oil: Energol RC-R 100 | Wax: Tecero ® wax 30332 | Yield of sieve fraction 1-6 mm | Dispersibility measured via Δa* a) | Attrition value (after 5 min) |
| Agent as per | wt % (based on total weight) | | wt % | CIELAB units | wt % |
| Example 1 | 0.84 | 14.9 | >70 | ±1.0 | <5 |
| Example 2 | 0.84 | 15.1 | >70 | ±1.0 | <5 | a) what was measured was the difference Δa* (= delta a*) = a* value (agent) minus a* value (reference) in the bitumen. Reference: Bayferrox 130 starting material Examples 1 and 2 provide agents having the yields for the particle size fraction 1-6 mm above 70 wt % with good color properties. Colorimetrically, the samples were comparable to Bayfenrox® 130 powder reference (starting material). These agents have a very good attrition stability (=low attrition value) (table 1).

Example 3

Comparative Example

To 15.0 kg of Bayferrox® 130 iron oxide red pigment was added 0.50 kg of Tecerowachs® 30332 microwax and the mixture was heated in a 75 L FM75 Henschel mixer up to about 150° C. and mixed at the same time for about 70 min (tool speed about 780 rpm, the temperature was measured in-product). Agents in piece form were obtained neither after 20 min nor after 70 min. The product remained pulverulent throughout the entire period of mixing. The yield for the particle-size fraction 1-6 mm was accordingly 0 wt %.

Example 4

Comparative Example

To 15.0 kg of Bayferrox® 130 iron oxide red pigment was added 15.0 kg of Tecerowachs® 30332 microwax and the mixture was heated in a 75 L FM75 Henschel mixer up to about 140° C. and at the same time mixed for about 30 min (tool speed about 780 rpm, the temperature was measured in-product). Agents in piece form were obtained neither after 20 min nor after 30 min. The product was pasty. The yield for the particle-size fraction 1-6 mm was accordingly 0 wt %.

Example 5

Comparative Example

Example 1 of patent document EP 0 567 882 B1 (producing an agent via pan granulation) was repeated. A color shift Δa* of −0.6 CIELAB units versus Bayferrox® 130 powder (2001 standard) was found. However, the agent only had very low attrition stability (attrition value after 5 minutes equal to more than 20 wt %).

What is claimed is:

1. A coloring agent comprising:
   at least one inorganic pigment selected from the group consisting of iron oxides, iron oxide hydroxides, chromium oxides, titanium dioxides and mixed-phase pigments based on metal oxides;
   one or more oils; and
   one or more waxes,
   wherein:
   at least 50 wt % of the agent has a particle size of 1 mm or more;
   the total amount of wax or waxes is greater than 10 to 25 wt %, based on the total amount of the agent;
   the total amount of oil or oils is from 0.1 to 5.0 based on the total amount of the agent; and
   the agent has an attrition value of 10 wt % or less.

2. The agent as claimed in claim 1, characterized in that the oil or oils are selected from the group consisting of synthetic oils, mineral oils, animal oils, and vegetable oils, wherein the synthetic oils consist essentially of carbon and hydrogen and/or nitrogen and/or oxygen and/or sulfur and/or halogens and/or boron.

3. The agent as claimed in claim 2, characterized in that the synthetic oils are based on hydrocarbons.

4. The agent as claimed in claim 1, characterized in that the waxes have a congealing point between 50° C. and 140° C.

5. The agent as claimed in claim 1, characterized in that the waxes are selected from the group consisting of Fischer-Tropsch waxes, mineral waxes, montan waxes, vegetable waxes and animal waxes.

6. The agent as claimed in claim 1, characterized in that the total amount of wax or waxes is from 13 to 20 wt % based on the total amount of the agent.

7. The agent as claimed in claim 1, wherein:
   the oil or oils are selected from the group consisting of synthetic oils, mineral oils, animal oils, and vegetable oils, wherein the synthetic oils are based on hydrocarbons and consist essentially of carbon and hydrogen and/or nitrogen and/or oxygen and/or sulfur and/or halogens and/or boron; and
   the wax or waxes have a congealing point between 50° C. and 140° C. and are selected from the group consisting of Fischer-Tropsch waxes, mineral waxes, montan waxes, vegetable waxes and animal waxes, and the total amount of wax or waxes is from 13 to 20 wt % based on the total amount of the agent.

8. A process for producing agents as claimed in claim 1 by:
   A)
   a) at least one inorganic pigment is mixed with one or more oils and
   b) the mix of step a) is mixed with one or more waxes,
   c) the mixture of step b) is further mixed at a temperature above a congealing point of the wax or of the waxes,
   or B)
   a') at least one inorganic pigment is mixed with one or more waxes and
   b') the mix of step a') is mixed with one or more oils,
   c') the mixture of step b') is further mixed at a temperature above a congealing point of the wax or of the waxes,
   or C)
   at least one inorganic pigment is simultaneously mixed with one or more oils and with one or more waxes, and the mixture is then further mixed at a temperature above a congealing point of the wax or of the waxes.

9. The process for producing agents as claimed in claim 8, characterized in that the agent formed is cooled down to ambient temperature and then sieved to a particle size range such that at least 50 wt % of the agent has a particle size of 1 mm or more.

10. The process for producing agents as claimed in claim 8 or 9, characterized in that steps a) or a') are carried out at a temperature below the congealing points of the waxes.

11. The process for producing agents as claimed in claim 8, further comprising heating the mixture of step a) or a') to a temperature in the range from 60° C. to 150° C. before steps b) or b').

12. The process for producing agents as claimed in claim 8, further comprising conducting steps c) or C') at 110° C. to 230° C.

13. The process for producing agents as claimed in claim 8, further comprising raising the temperature of the mixture to a temperature in the range from 110° C. to 230° C. after simultaneous addition of oil or oils, wax or waxes to the inorganic pigment.

14. The process for producing agents as claimed in claim 8, further comprising:
   for A) or B)
      conducting steps a) or a') at a temperature below the congealing temperature of the waxes;
      heating the mixture produced from step a) or a') to a temperature in the range from 60° C. to 150° C. before steps b) or b'); and
      conducting steps c) or c') at a temperature of 110° C. to 230° C.;
   or for C)
      raising the temperature of the mixture to a temperature in the range from 110° C. to 230° C. after simultaneous addition of oil or oils, wax or waxes to the inorganic pigment;
   cooling the agent formed by either of A), B), or C) to ambient temperature; and
   sieving the agent to a particle size range such that at least 50 wt % of the agent has a particle size of 1 mm or more.

15. A process for coloration of building products comprising asphalt, bitumen, bituminous mixtures, tar or tar-containing compositions, the process comprising adding agents as claimed in claim 1 to the asphalt, bitumen, bituminous mixtures, or tar and tar-containing compositions.

16. A process for coloration of building products comprising asphalt, bitumen, bituminous mixtures, tar or tar-containing compositions, the process comprising mixing the agent as claimed in claim 1 with the building product at a temperature above a softening point of the building product.

17. A building product colored with agents as claimed in claim 1.

* * * * *